United States Patent
Wang et al.

(10) Patent No.: US 8,074,460 B2
(45) Date of Patent: Dec. 13, 2011

(54) DEVICE FOR ADJUSTING TEMPERATURE AND HUMIDITY USING WIND POWER

(75) Inventors: An-Bang Wang, Taipei (TW);
 Chia-Fong Lee, Taipei (TW);
 Wen-Chin Tsai, Taipei (TW); I-Chun Lin, Taipei (TW); Fei-Yau Lu, Taipei (TW); Chih-Chieh Chen, Taipei (TW);
 Liang-Jenq Leu, Taipei (TW);
 Chuin-Shan Chen, Taipei (TW);
 Wen-Pin Shih, Taipei (TW)

(73) Assignee: National Taiwan University, Taipei (TW)

( * ) Notice: Subject to any disclaimer, the term of this patent is extended or adjusted under 35 U.S.C. 154(b) by 562 days.

(21) Appl. No.: 12/170,915

(22) Filed: Jul. 10, 2008

(65) Prior Publication Data
US 2009/0108085 A1   Apr. 30, 2009

(30) Foreign Application Priority Data
Oct. 30, 2007 (TW) ................. 96140878 A

(51) Int. Cl.
*F28D 3/00* (2006.01)
*F28D 5/00* (2006.01)
(52) U.S. Cl. ........ 62/171; 62/259.4; 62/314; 73/170.14; 73/861.42

(58) Field of Classification Search ........... 62/121, 62/171, 259.4, 314; 236/44 C; 73/170.11, 73/170.14, 861.42, 861.47; 239/13
See application file for complete search history.

(56) References Cited

U.S. PATENT DOCUMENTS

| | | | |
|---|---|---|---|
| 5,340,025 A * | 8/1994 | Pearce | 239/70 |
| 2005/0006497 A1* | 1/2005 | Polak | 239/289 |
| 2008/0242218 A1* | 10/2008 | Asano et al. | 454/338 |
| 2009/0108087 A1* | 4/2009 | Goldmann et al. | 239/1 |

FOREIGN PATENT DOCUMENTS

| | | |
|---|---|---|
| TW | 274894 | 4/1996 |
| TW | 347822 | 12/1998 |
| TW | 394368 U | 6/2000 |
| TW | M250052 | 11/2004 |
| TW | M255386 | 1/2005 |
| TW | M293354 | 12/2005 |
| TW | M311858 U | 5/2007 |

* cited by examiner

*Primary Examiner* — Marc Norman
(74) *Attorney, Agent, or Firm* — Volpe and Koenig, P.C.

(57) ABSTRACT

A device for adjusting a temperature and a humidity using a wind power is provided. The device includes an inlet; an outlet connected to the inlet; a sprayer spraying a nebulized liquid into the device; and an airflow sensor electrically connected to the sprayer for activating the sprayer when an airflow passes through.

8 Claims, 3 Drawing Sheets

DEVICE FOR ADJUSTING TEMPERATURE AND HUMIDITY USING WIND POWER

FIELD OF THE INVENTION

The present invention relates to a device for adjusting temperature and humidity, and more particularly to a device for adjusting temperature and humidity using wind power.

BACKGROUND OF THE INVENTION

In the freezing and conditioning technology, the adjustment of temperature and humidity is the most important issue. The conventional air conditioner includes a compressor, a radiator, an expansion valve, an evaporator and so on. The principle of the conventional air conditioner is to compress the refrigerant into the high-temperature high-pressure liquid via the compressor, and then the high-temperature high-pressure liquid is radiated via the radiator to become the high-pressure low-temperature liquid. Subsequently, the high-pressure low-temperature liquid is transmitted to the evaporator via the expansion valve and proceeds heat exchange with the air outside the evaporator. In the meantime, the refrigerant inside the evaporator is gasified. Generally, the air outside the evaporator is further pushed by the fan. Afterwards, the refrigerant is transmitted back to the compressor. Such air conditioner is widely used in various buildings or mobile carriers. However, such air conditioner only circularly cools the air inside the airtight space, which is unable to react with the external fresh air. Moreover, the air conditioner also produces and discharges heat, wherein the radiator discharges the most heat.

Certainly, not all of the space needs the above energy-consuming cooling system, so the water mist cooling technology is used to reduce the air temperature. The water mist cooling technology is to absorb heat via the water mist mixed in the air, thereby reducing the air temperature. Currently, such technology is mostly used to cool down the greenhouse and improve the water-cooling fan. The conventional water mist cooling technology is to absorb moisture via the fiber, and then the fiber is blowed by wind from the fan. Therefore, the water inside the fiber absorbs the heat of the air and evaporates so that the temperature of the air passing through the fiber is reduced. However, in this way, the air does not sufficiently contact with the water mist, so the temperature is not significantly reduced. Furthermore, the fiber is in a wet state for a long time, which is easy to be moldy and smelly and the bacteria might be generated. This contaminates the environment of the user.

Hence, for solving this issue, some people propose a method of cooling down the air temperature by spraying the water drop and the water mist, as shown in the Taiwan Patent Nos. 347822 and 255386. These two patents both use the water mist tube to nebulize water so as to proceed heat exchange with the air pushed by the fan. But practically, the water mist molecule generated by the water mist tube is not small enough, so the heat exchange efficiency still is not high enough. Moreover, when the water inside the water mist tube runs out, it cannot be automatically replenished. This is inconvenient. Besides, the Taiwan Patent No. 250052 discloses spraying water drops on the heat exchanger, so that when the thermal air is introduced by the fan and contacts the heat exchanger, water drops may absorb the heat of the thermal air and evaporate, thereby achieving the cooling effect. However, this results in an insufficient heat exchange due to the excessively large airflow resistance and the excessively large water mist molecule. Furthermore, the Taiwan Patent No. 293354 discloses the use of a mist-making system and an automatic water-filling apparatus for cooling down temperature. However, this patent still needs the fan to push the air for generating the airflow, or it is difficult to operate. In addition, the Taiwan Patent No. 274894 discloses a combination of the air conditioner and the water-cooling fan. This patent cools the water via the cooling system of the air conditioner, and then converts the cooled water into the water mist via the sprayer for enhancing the cooling efficiency. However, the compressor will consume a lot of power and generate heat.

Therefore, for the temperature and humidity adjusting system, a more power-saving, inexpensive, environmentally friendly and efficient device for reducing the air temperature is necessary, which can be used not only inside the building but also on the mobile carrier so as to replace or assist the original cooling system.

In order to overcome the drawbacks in the prior art, a device for adjusting temperature and humidity using wind power is provided. The particular design in the present invention not only solves the problems described above, but also is easy to be implemented. Thus, the present invention has the utility for the industry.

SUMMARY OF THE INVENTION

In accordance with one aspect of the present invention, a device for adjusting a temperature and a humidity using a wind power is provided. The device includes an inlet; an outlet connected to the inlet; a sprayer spraying a nebulized liquid into the device; and an airflow sensor electrically connected to the sprayer for activating the sprayer when an airflow passes through.

Preferably, the sprayer is further connected to a liquid tank and obtains a liquid therefrom for generating the nebulized liquid.

Preferably, a pump (not shown) is disposed between the sprayer and the liquid tank. When the liquid inside the sprayer is insufficient, the pump pumps liquid from the liquid tank and supplements it into the sprayer.

Preferably, the device further includes a direction changing device for changing a direction of the inlet.

Preferably, the direction changing device is further electrically connected to a wind direction sensor, wherein the wind direction sensor senses a wind direction and sends a wind direction datum to the direction changing device, so that the inlet is controlled by the direction changing device to face the wind direction.

Preferably, the sprayer is an ultrasonic sprayer.

Preferably, the inlet tapers off to the outlet.

Preferably, the airflow sensor includes a static portion; and a moving portion movably disposed on the static portion, wherein the airflow sensor activates the sprayer when the moving portion is pushed by the airflow and in a relative motion to the static portion.

Preferably, the moving portion includes a wind receiving portion being pushed by the airflow; and a triggering portion for triggering the sprayer to operate.

Preferably, the triggering portion is a limit switch electrically connected to the sprayer for serving as a switch thereof.

Preferably, the device further includes a restoring member disposed between the static portion and the moving portion for applying force to the moving portion to make it stay at a stopping position, so that the moving portion is restored to the stopping position when a thrust by the airflow is smaller than the applied force by the restoring member.

Preferably, a fan (not shown) is disposed inside the outlet for increasing the exhaust volume.

The above objects and advantages of the present invention will become more readily apparent to those ordinarily skilled in the art after reviewing the following detailed descriptions and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for the purposes of illustration and description only; it is not intended to be exhaustive or to be limited to the precise form disclosed.

Figure 1:
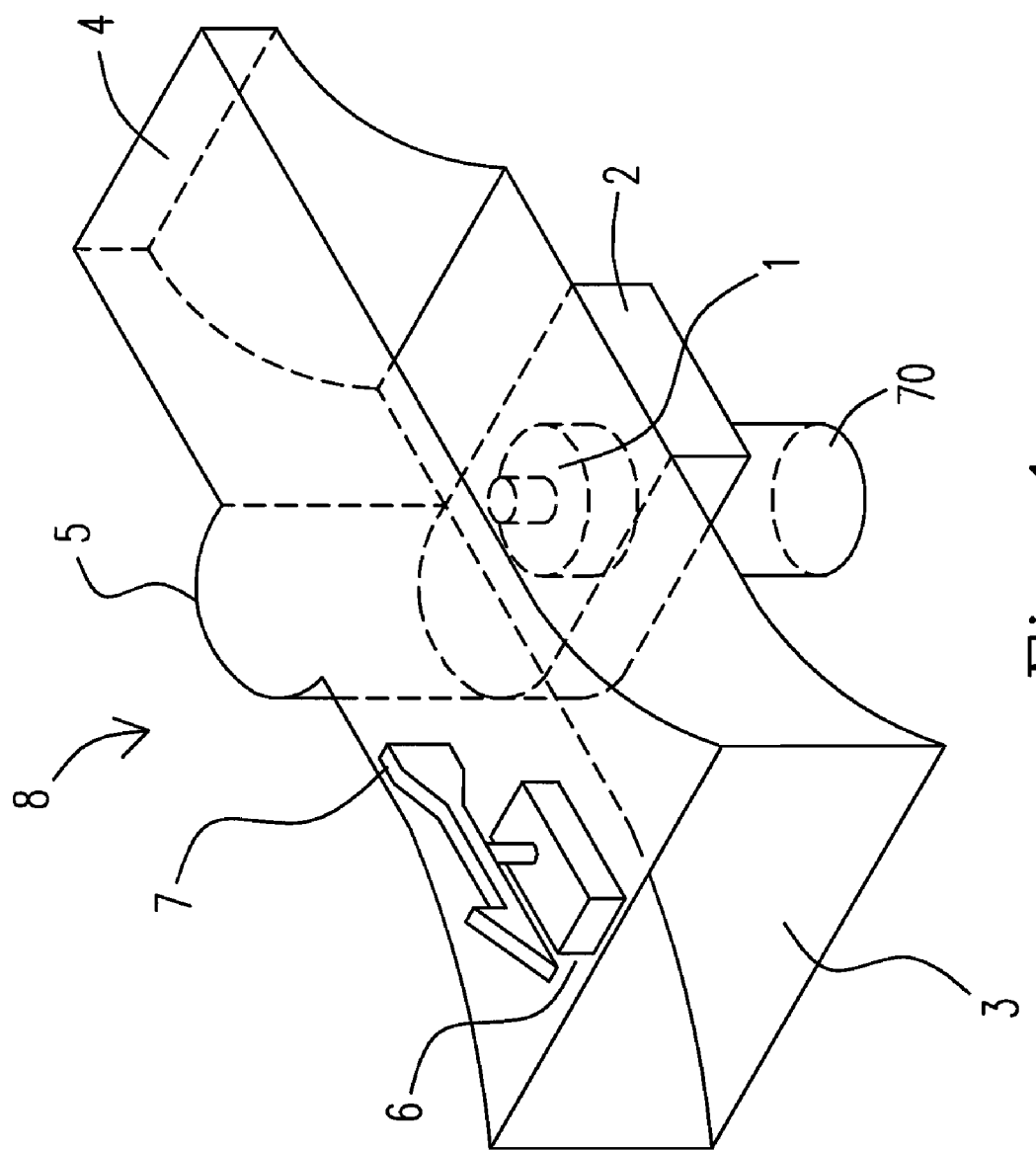
FIG. 1 is a schematic diagram showing the device for adjusting temperature and humidity using wind power in the present invention.
Figure 2:
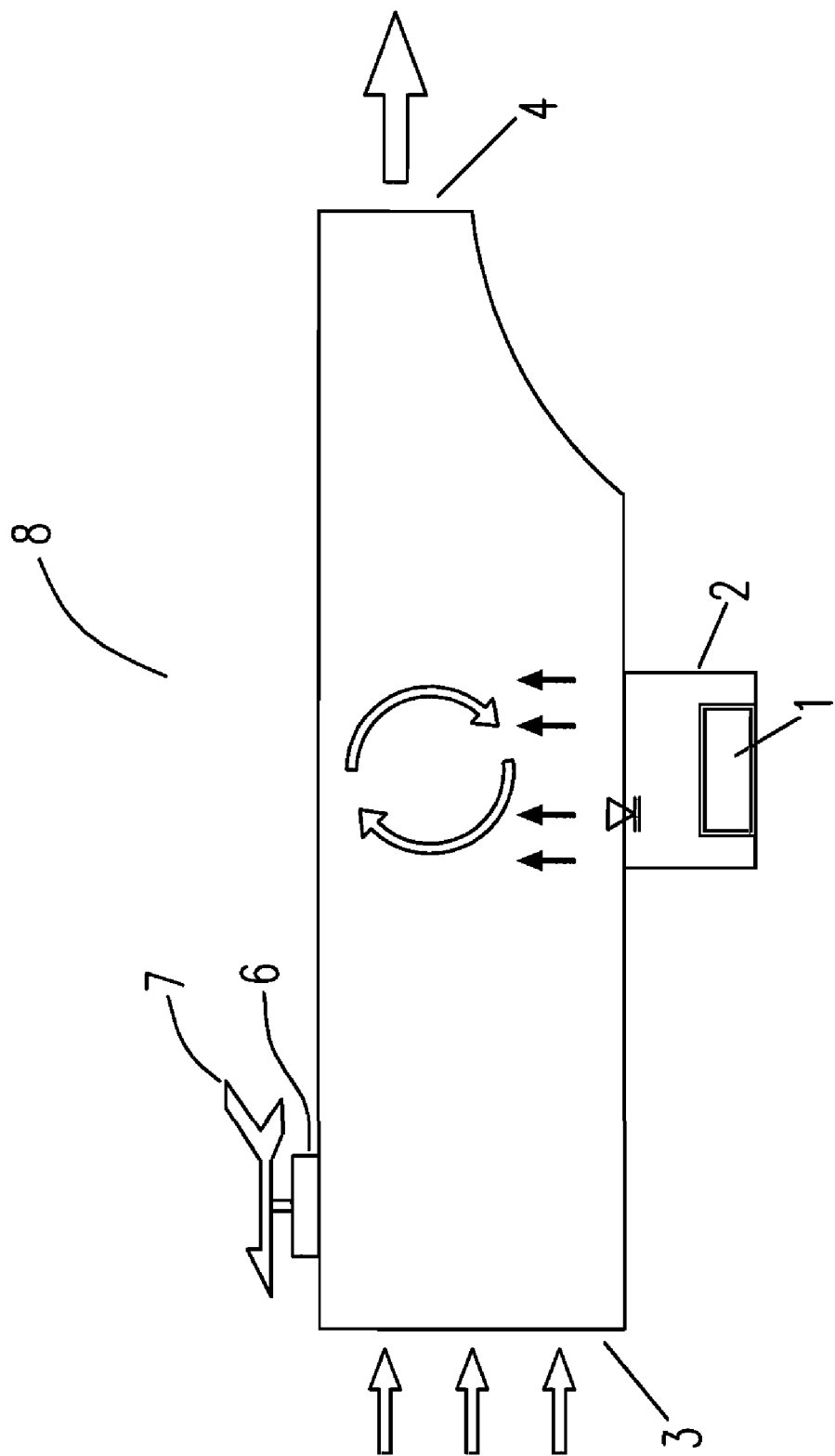
FIG. 2 is a side view of the device for adjusting temperature and humidity using wind power of FIG. 1 during operation.
Figure 3:
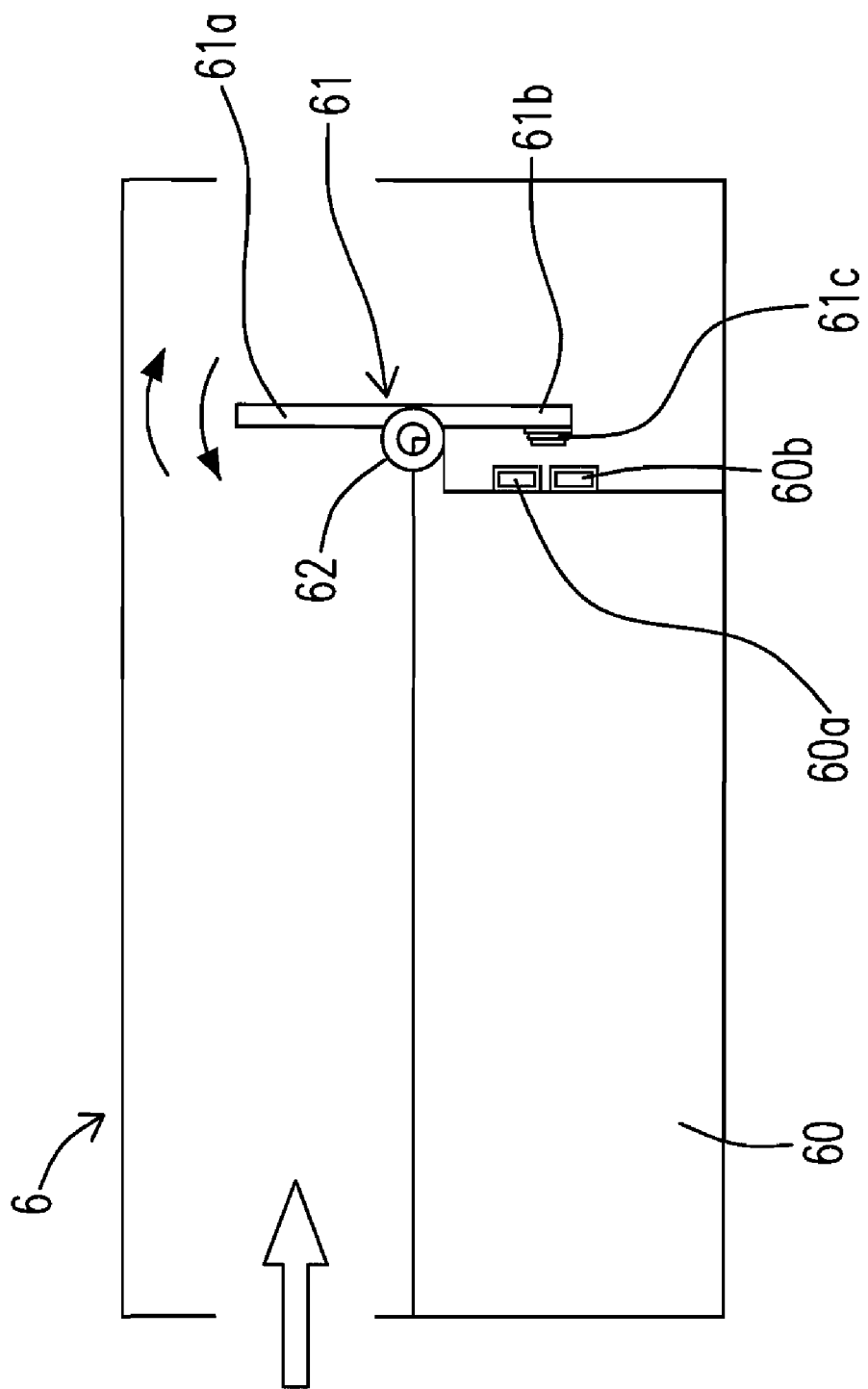
FIG. 3 is a schematic diagram showing the airflow sensor in the present invention.

Please refer to FIG. 1, which is a schematic diagram showing the device for adjusting temperature and humidity using wind power in the present invention. The device for adjusting temperature and humidity using wind power 8 has an inlet 3 and an outlet 4 connected thereto. The air enters the device 8 via the inlet 3 and then exhausts via the outlet 4. As shown in FIG. 1, the device 8 is channel-shaped and has two openings, wherein one opening is the inlet 3 and the other is the outlet 4. A sprayer 1 is disposed on the device 8 for nebulizing the liquid. When the external air enters the device 8 via the inlet 3, the heat of the air will evaporate the nebulized liquid. In other words, since the nebulized liquid absorbs the heat of the air and evaporates, the temperature of the air is reduced. Then, the air mixed with the nebulized liquid exhausts via the outlet 4.

Please refer to FIG. 1 again, for achieving better using efficiency, the sprayer 1 is directly disposed in a liquid tank 2 so that the sprayer 1 may directly obtain the liquid in the liquid tank 2 for use. Besides, a liquid-filling device 5 is further disposed. When the liquid inside the liquid tank 2 is insufficient, the liquid-filling device 5 may supplement liquid thereinto. Moreover, an airflow sensor 6 is disposed on the device 8. When the airflow passes through the airflow sensor 6, the sprayer 1 is actuated to generate the nebulized liquid. This prevents the user from operating the sprayer 1 manually. For improving the efficiency of the present invention, a direction changing device 70 is further disposed for rotating the device 8 so that the inlet 3 may face the wind direction and receive as much air as possible. For a convenient operation, a wind direction sensor 7 is further disposed and electrically connected to the direction changing device 70 for controlling the direction changing device 70 to rotate the device 8 when detecting the wind direction. Hence, the using efficiency of the present invention is enhanced. Moreover, for increasing the velocity of the airflow, it can be seen in FIG. 1 that the inlet 3 tapers off to the outlet 4 so that the velocity of the airflow exhausting from the outlet 4 is apparently higher than the velocity of the airflow entering the inlet 3.

Please refer to FIG. 2, which is a side view of the device for adjusting temperature and humidity using wind power of FIG. 1 during operation, wherein an airflow is passing through the device 8. Generally, the device 8 is operated with the aid of the blowing of the external air, rather than with the aid of the blowing machine and the like to introduce the airflow thereinto. As shown in FIG. 2, the device 8 is disposed in a mobile carrier (not shown), so that an airflow is generated when the wind blows the device 8 or when the mobile carrier moves. The inlet 3 will face the wind direction with the aid of the wind direction sensor 7. When the wind power is sufficient to trigger the airflow sensor 6, the sprayer 1 is actuated to nebulize the liquid in the liquid tank 2. Then, the nebulized liquid is mixed with the airflow and absorbs the heat of the gas for reducing the temperature of the gas, and then exhausts via the outlet 4. As long as the velocity of wind is large enough and the liquid in the liquid tank 2 is sufficient, the device 2 may be operated normally and continuously.

Please refer to FIG. 3, which is a schematic diagram showing the airflow sensor in the present invention, wherein the airflow sensor 6 includes a static portion 60 and a moving portion 61 disposed on the static portion 60. When the moving portion 61 is pushed by the airflow, it is in a relative motion to the static portion 60. This confirms whether there is sufficient airflow for the device 8 to use, thereby determining whether the sprayer 1 is actuated. A restoring member 62 is further disposed between the static portion 60 and the moving portion 61 for restoring the moving portion 61 to a stopping position. That is, when the airflow is insufficient to counteract the force from the restoring member 62, the restoring member 62 will make the moving portion 61 stay in the stopping position. This will not actuate the sprayer 1.

Please refer to FIG. 3 again, wherein the moving portion 61 further includes a wind receiving portion **61*a* and a triggering portion 61*b*, and the restoring member 62 is disposed therebetween. Besides, an electric conductor 61*c* is disposed on the triggering portion 61*b*, and a first terminal 60*a* and a second terminal 60*b* are respectively disposed on the static portion 60 which are corresponding to the position of the triggering portion 61*b*. The first terminal 60*a* and the second terminal 60*b* are respectively electrically connected to the sprayer 1. When the wind receiving portion 61*a* is pushed by sufficient airflow, the moving portion 61 is rotated clockwise. This enables the electric conductor 61*c* to contact the first terminal 60*a* and the second terminal 60*b* so that the first terminal 60*a* is conducted with the second terminal 60*b*, and thus the sprayer 1 is actuated to generate the nebulized liquid. Contrarily, when the airflow is insufficient to push the wind receiving portion 61*a*, the moving portion 61 is rotated anticlockwise by the restoring member 62 to return to the stopping position. At this time, the first terminal 60*a* and the second terminal 60*b* are open-circuited, and the sprayer 1 stops operating. In other words, when there is no airflow, the restoring member 62 provides an anticlockwise force to prevent the electric conductor 61*c* from contacting both the first terminal 60*a* and the second terminal 60*b*. Generally, the restoring member 62** is a spiral spring.

Furthermore, the airflow sensor 6 may be replaced by a flow meter (not shown), a barometer (not shown) or a wind power generator (not shown) to achieve the same effect. If the airflow sensor 6 is replaced by a flow meter, a specific flow velocity value may be set. When the flow velocity is higher than the specific flow velocity value, the sprayer 1 is actuated. On the contrary, when the flow velocity is lower than the specific flow velocity value, the sprayer 1 is not actuated. If the airflow sensor 6 is replaced by a barometer, a specific pressure value (fluid full pressure) may be set. When the flow velocity pressure is higher than the specific pressure value, the sprayer 1 is actuated. On the contrary, when the flow velocity pressure is lower than the specific pressure value, the sprayer 1 is not actuated. If the airflow sensor 6 is replaced by a wind power generator, a specific current value or a specific voltage value may be set. The specific current value or the specific voltage value may serve as a threshold to actuate the sprayer 1.

In conclusion, the present invention uses natural wind or the wind resulting from the moving of the carrier to serve as the wind source for adjusting temperature and humidity, which does not need a fluid machine, such as a fan, to drive gas to move by compulsion. The structure of the present invention is simple and rigid, which may reduce flow resistance, save energy, decrease noise and avoid polluting the environment. In addition, if the sprayer 1 is an ultrasonic sprayer, the nebulized liquid generated thereby has a tiny volume, so that the surface area thereof is large and the heat exchange efficiency between the present invention and the external air is high. Therefore, more heat is adsorbed and the cooling efficiency is enhanced, so that the purpose of adjusting temperature and humidity is achieved more efficiently. Hence, the present invention features a low production cost, is free of the drawbacks of the conventional air conditioner, and may be disposed on various mobile carriers such as a vehicle, a ship or an aircraft. Therefore, the present invention effectively solves the problems and drawbacks in the prior art, and thus it fits the demand of the industry and is industrially valuable.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A device for adjusting a temperature and a humidity using a wind power, comprising:
    an inlet having a direction;
    an outlet connected to the inlet;
    a sprayer spraying a nebulized liquid into the device;
    an airflow sensor electrically connected to the sprayer for activating the sprayer when an airflow passes through; and
    a direction changing device that changes the direction of the inlet to face a wind direction.

2. The device as claimed in claim 1, wherein the sprayer is further connected to a liquid tank and obtains a liquid therefrom for generating the nebulized liquid.

3. The device as claimed in claim 1, wherein the direction changing device is further electrically connected to a wind direction sensor, wherein the wind direction sensor senses the wind direction and sends a wind direction datum to the direction changing device, so that the inlet is controlled by the direction changing device to face the wind direction.

4. The device as claimed in claim 1, wherein the sprayer is an ultrasonic sprayer.

5. The device as claimed in claim 1, wherein the inlet tapers off to the outlet.

6. The device as claimed in claim 1, wherein the airflow sensor comprises:
    a static portion; and
    a moving portion movably disposed on the static portion, wherein the airflow sensor activates the sprayer when the moving portion is pushed by the airflow and in a relative motion to the static portion, and the moving portion includes:
        a wind receiving portion being pushed by the airflow; and
        a triggering portion for triggering the sprayer to operate.

7. The device as claimed in claim 6, wherein the triggering portion is a limit switch electrically connected to the sprayer for serving as a switch thereof.

8. The device as claimed in claim 1, further comprising a restoring member disposed between the static portion and the moving portion for applying force to the moving portion to make it stay at a stopping position, so that the moving portion is restored to the stopping position when a thrust by the airflow is smaller than the applied force by the restoring member.

* * * * *